US006970775B2

(12) United States Patent
Lederle et al.

(10) Patent No.: US 6,970,775 B2
(45) Date of Patent: Nov. 29, 2005

(54) METHOD OF TANK LEAK DIAGNOSIS

(75) Inventors: Karl-Bernhard Lederle, Renningen (DE); Michael Pfeil, Schwieberdingen (DE); Nicolas Perrot, Eragny (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/786,383

(22) Filed: Feb. 25, 2004

(65) Prior Publication Data

US 2004/0186638 A1 Sep. 23, 2004

(30) Foreign Application Priority Data

Mar. 21, 2003 (DE) ................................ 103 12 588

(51) Int. Cl.[7] ........................ G01M 17/00; G01M 3/04; G01M 3/08; F02M 33/02

(52) U.S. Cl. ............................. 701/29; 73/49.7; 73/40; 73/40.5 R; 123/518

(58) Field of Search ........................... 701/29; 73/49.7, 73/40, 40.5 R; 123/518, 519, 520; 702/51

(56) References Cited

U.S. PATENT DOCUMENTS

2002/0139173 A1 10/2002 Kano et al. .................. 73/49.7

FOREIGN PATENT DOCUMENTS

DE 198 30 234 A1 1/2000

*Primary Examiner*—Thomas G. Black
*Assistant Examiner*—Brian J. Broadhead
(74) *Attorney, Agent, or Firm*—Michael J. Striker

(57) ABSTRACT

A method of tank leak diagnosis in a tank ventilation device including a fuel tank which is connected at least indirectly through a storage and tank ventilation valve with a suction pipe of an internal combustion engine of the vehicle, with the storage having an aeration conduit with a check valve, includes performing a tank leak diagnosis by a negative pressure after turning off of the internal combustion engine; and producing the negative pressure in the fuel tank immediately before the turning off of the internal combustion engine.

10 Claims, 2 Drawing Sheets

METHOD OF TANK LEAK DIAGNOSIS

BACKGROUND OF THE INVENTION

The present invention generally relates to a method for tank leak diagnosis.

One of such methods for a tank leak diagnosis is disclosed for example in U.S. patent document 2002/0139173A1. The tank leak diagnosis in accordance with this method is performed after turning off of an internal combustion engine. A pump, after turning off of the internal combustion engine, generates a negative pressure in the fuel tank. A leak in the fuel tank is recognized by a pressure increase in the fuel tank, which is caused by the leak. This method however has the disadvantage in that the negative pressure is produced after the turning off of the internal combustion engine, since the gas which is aspirated from the tank ventilating device can no longer be supplied for combustion in the internal combustion engine. Instead, the gas must be intermediately stored in an additional storage which is quite complicated and expensive and not discharged into the atmosphere. Moreover, it is also disadvantageous that the negative pressure is produced by an additional pump.

German patent document DE 198 20 234 C2 discloses a method of a tank leak diagnosis, in which during approximately the whole operation of the internal combustion engine a constant negative pressure in the fuel tank is maintained. This method has the disadvantage that a storage which receives the evaporated fuel can not be rinsed to a full degree, when the storage is held approximately during the whole operation of the internal combustion engine under a predetermined negative pressure. Thereby the storage, during turning off of the internal combustion engine, is not completely emptied, so that the storage capacity of the storage and a loading time during which fuel can be received in the storage in a loading phase is reduced when compared to a completely regenerated storage.

SUMMARY OF THE INVENTION

Accordingly, it is an object of the present invention to provide a method of tank leak diagnosis, which avoids the disadvantages of the prior art.

In keeping with these objects and with others which will become apparent hereinafter, one feature of the present invention resides, briefly stated, in a method of tank leak diagnosis in a tank ventilation device including a fuel tank which is connected at least indirectly through a storage and a tank ventilation valve with a suction pipe of an internal combustion engine of the vehicle, with the storage having an aeration conduit with a check valve, wherein the method comprises the steps of performing a tank leak diagnosis by a negative pressure after turning off of the internal combustion engine; and producing the negative pressure in the fuel tank immediately before the turning off of the internal combustion engine.

The method of a tank leak diagnosis in accordance with the present invention has the advantage that it is simplified in a simple manner, in that the negative pressure for the tank leak diagnosis in the fuel tank is produced shortly before the turning off of the internal combustion engine. In this case the negative pressure in a so-called suction pipe of the internal combustion engine is used for a negative pressure buildup in the fuel tank, so that an additional pump for a negative pressure generation and an additional storage are dispensed with.

It is especially advantageous when a predetermined negative pressure in the fuel tank is produced by a closing of the flow element and at least partially opening of the tank ventilation valve, and subsequently in a pressure regulating phase by means of a regulation of the tank ventilation valve it is held approximately constant, since in this way the negative pressure is maintained constant only for a short time and a negative influence on the regeneration of the tank ventilation device is avoided.

Moreover, it is also advantageous when the regulation of the negative pressure to the constant value is a two-point regulation or a continuous regulation, since the negative pressure in the fuel tank in this manner can be regulated with a small regulation deviation by the predetermined negative pressure.

It is further advantageous when the tank ventilation valve is closed as soon as the internal combustion engine is turned off, since subsequently the tank leak diagnosis can be performed, which monitors the pressure course starting from the negative pressure produced before the turning off of the internal combustion engine.

It is further advantageous when the negative pressure in the fuel tank for a tank leak diagnosis is produced when a turning-off signal formed in a motor control indicates a preceding turning off of the internal combustion engine, since in this way the negative pressure is produced shortly before the turning off of the internal combustion engine and the storage capacity of the storage is not negatively affected.

It is further advantageous when the turning off signal is produced when a preceding turning off of the internal combustion engine is taken from characteristic variables of a motor control, since in this way it is possible to build up the negative pressure shortly before the turning off of the internal combustion engine.

The characteristic variables of the motor control are for example a rotary speed, an operational condition or a transmission stage of the internal combustion engine. These characteristic variables permit for example to make a conclusion about the possible turning off of the internal combustion engine.

In accordance with the advantageous embodiment of the present invention, the turning off signal can be produced when a switching means which switch off the internal combustion engine is actuated. In this way the turning off of the internal combustion can be reliably recognized.

It is advantageous when the internal combustion engine is turned off after a time delay for actuation of the switching means which switch of the internal combustion engine, since in this way a sufficient time remains for building up of the predetermined negative pressure in the fuel tank.

It is also advantageous when the negative pressure in the fuel tank can be measured by a pressure sensor which monitors the pressure course in the tank ventilation system.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
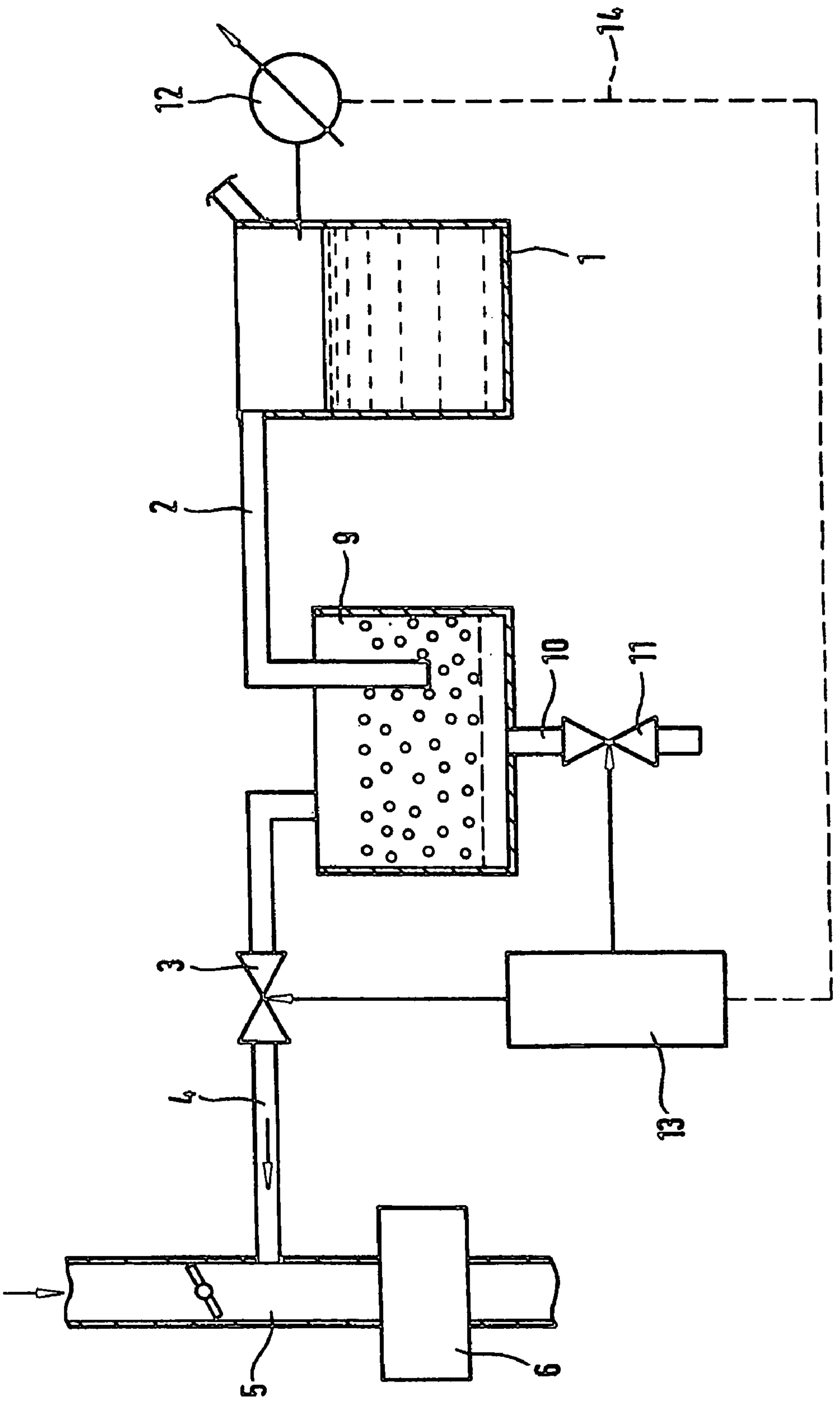
FIG. 1 is a view showing an example of realization of a method of a leak diagnosis in accordance with the present invention.

A known tank ventilation device is shown in a simplified way in the drawing. The tank ventilation device operates for supplying an evaporated fuel from a fuel tank to an internal combustion engine. A fuel tank 1 is connected through a ventilation conduit 2, a tank ventilation valve 3 and a suction conduit 4 at least indirectly with a so-called suction pipe 5 of an internal combustion engine 6. For example one storage 9 can be arranged in the ventilation conduit 2. In a known manner it takes preliminarily the fuel evaporated from the fuel tank 1. The storage 9 contains a material which absorbs the fuel, for example activated coal. The storage 9 is connected through an aeration conduit 10 with atmosphere. The aeration conduit 10 has a flow element 11 formed for example as a check valve.

A pressure sensor 12 measures a pressure in the fuel tank 1 and supplies a signal through a signal conductor 14 to an electronic motor control 13. The pressure sensor 12 is for example a differential pressure sensor, however it can be also formed as an absolute pressure sensor. The motor control 3 is connected through further signal conductors with the tank ventilation valve 3 and the flow element 11, and can control the tank ventilation valve 3 and the flow element 11 being open or closed.

The inventive method of tank leak diagnosis is performed with the aid of the above described tank ventilation device. The storage 9 in a charging phase takes the fuel evaporated from the fuel tank 1 preliminarily. The charging phase is a phase when the internal combustion engine 6 does not run and the vehicle for example is turned off on a parking place. After the charging phase, or after starting the internal combustion engine, the tank ventilation valve 3 is opened in a rinsing phase and fresh air is aspirated by a negative pressure in the suction pipe 5 via the aeration conduit 10 through the storage 9. The fuel absorbing material of the storage 9 discharges the received fuel onto the fresh air. This process is identified as desorption. Thereby a fuel-air mixture is produced which is composed of fresh air and fuel discharged from the storage 9. The volume flow of the fuel-air mixture is identified as a rinsing volume flow. The rinsing volume flow is supplied through the open tank ventilation valve 3 into the suction pipe 5 and is supplied then for combustion into the internal combustion engine.

The inventive method of a tank leak diagnosis serves for determining a leak in the fuel tank 1, including the ventilation conduit 2, the aeration conduit 10 and the storage 9 as well as the tank ventilation valve 3 and the flow element 11. With such a leak the evaporated fuel can be discharged into the atmosphere and lead to high hydrocarbon emissions.

In the inventive method of the tank leak diagnosis during the operation of the internal combustion 6 shortly before the turning off, a negative pressure is built in the fuel tank 1, by closing the flow element 11 and opening the tank ventilation valve 3. Due to the negative pressure in the suction pipe 5, gas is aspirated from the fuel tank 1. Since because of the closed flow e ement 11 more fresh air can flow from the atmosphere, a negative pressure is produced in the fuel tank 1.

The turning off of the internal combustion engine 6 can be recognized preliminarily from characteristic variables of the motor control, for example a rotary speed or the operation type of the internal combustion engine 6 with a certain probability. When for example the rotary speed of the internal combustion engine 6 over a predetermined time is under a predetermined value, then a preceding turning off of the internal combustion engine 6 can be performed. In this situation the motor control generates for example a turning off signal, which provides the build up of the negative pressure in the fuel tank 1 with the still running internal combustion engine 6, by closing the flow element 11 and opening the tank ventilation valve 3.

It is however also possible to recognize the preceding turning off of the internal combustion engine 6 by a driver's actuation of a switching means which switches off the internal combustion engine, and therefore to form the turning off signal. For providing a sufficient time for building up of the predetermined negative pressure in the fuel tank 1, the internal combustion engine 6 is turned off when the predetermined negative pressure in the fuel tank 1 is reached. The turning off of the internal combustion engine 6 is performed in this example with a time delay to the actuation of the switching means for switching off of the internal combustion engine 6 by a driver.

When the negative pressure in the fuel tank 1 reaches the predetermined value, the tank ventilation valve 3 is controlled being open or closed by a regulation of the motor control 13, for example by means of a two-point regulation or a continuous regulation, so that the negative pressure in the fuel tank 1 is maintained approximately constant at a predetermined value.

With turning off the internal combustion 6 and thereby stopping of the vehicle, the pressure regulating phase ends, the tank ventilation valve 3 is closed, and subsequently the tank leak diagnosis is started. The tank leak diagnosis monitors the negative pressure in the fuel tank 1 by means of the pressure sensor 12 starting from the constant negative pressure built up in the pressure regulating phase. With a tight ventilation device, the constant negative pressure in the fuel tank 1 is maintained. With an untight tank ventilation device, air can flow from the atmosphere into the fuel tank 1, so that there the pressure increases. If the pressure in the fuel tank 1 increases within a predetermined time interval, the tank leak diagnosis concludes that there is a leak.

During the pressure regulating phase, the storage 9 can be rinsed not to a full degree as during the rinsing phase, so it is not completely regenerated and therefore does not have a full storage capacity, when the internal combustion engine 6 is turned off during the pressure regulating phase. Therefore it is recommended to close the flow element 11 first, and then to open the tank ventilation valve 3 when the motor control indicates with the turning-off signal a preceding turning off of the internal combustion engine 6. Thereby shortly before the possible turning off of the internal combustion engine 6, a constant negative pressure in the fuel tank 1 is built up, so that the pressure regulating phase is very short in time and does not act adversely for the storage capacity of the storage 9.

If the assumption is false and the internal combustion engine is not turned off within a predetermined time, the negative pressure in the fuel tank 1 is released, in that the flow element 11 is again open.

Since in accordance with the present invention the tank leak diagnosis is performed after the turning off of the internal combustion 6 and thereby during stopping of the vehicle, disturbing influences which negatively affect the tank leak diagnosis are reduced, so that the result of the tank leak diagnosis is more reliable than in the prior art. A disturbing influence is the degassing of the fuel during the tank leak diagnosis, since during the degassing of the fuel the pressure of the fuel tank 1 increases and thereby a negative pressure is reduced, so that a false conclusion can be made about a not available leakage. The diagnosis is for example influenced during acceleration, braking or a curved travel of the vehicle, and over alternating street sections, since the fuel is movable back and forth differently in the fuel tank 1. A further disturbing influence is a change of the atmospheric pressure, which occurs for example in a mountain travel or a downward travel. With the change of the atmospheric pressure the differential pressure between the fuel tank 1 and the atmosphere changes, which falsifies the diagnosis results when the pressure sensor is a differential pressure sensor.

During a downward travel the atmospheric pressure increases and thereby also the pressure difference, so that the negative pressure in the fuel tank 1 also increases. During a mounting travel, the atmospheric pressure lowers and thereby also the pressure difference, so that the negative pressure in the fuel tank 1 reduces. The change on the atmospheric pressure can superpose in increasing or reducing manner with the negative pressure built-up caused by a leak, and thereby can falsify the diagnosis result.

Since the tank leak diagnosis is performed after the turning off of the internal combustion engine, there is sufficient time available for performing of the tank leak diagnosis. Also, disturbances produced during the operation of the internal combustion engine 6, for example by the operation of the fuel pump in the fuel tank 1, are avoided. The tank leak diagnosis performed in idle running to the contrary is dependent on the number and the time of the idle running phases and often must be interrupted without obtaining a diagnosis result, since for example the idling phase is very short.

Figure 2:
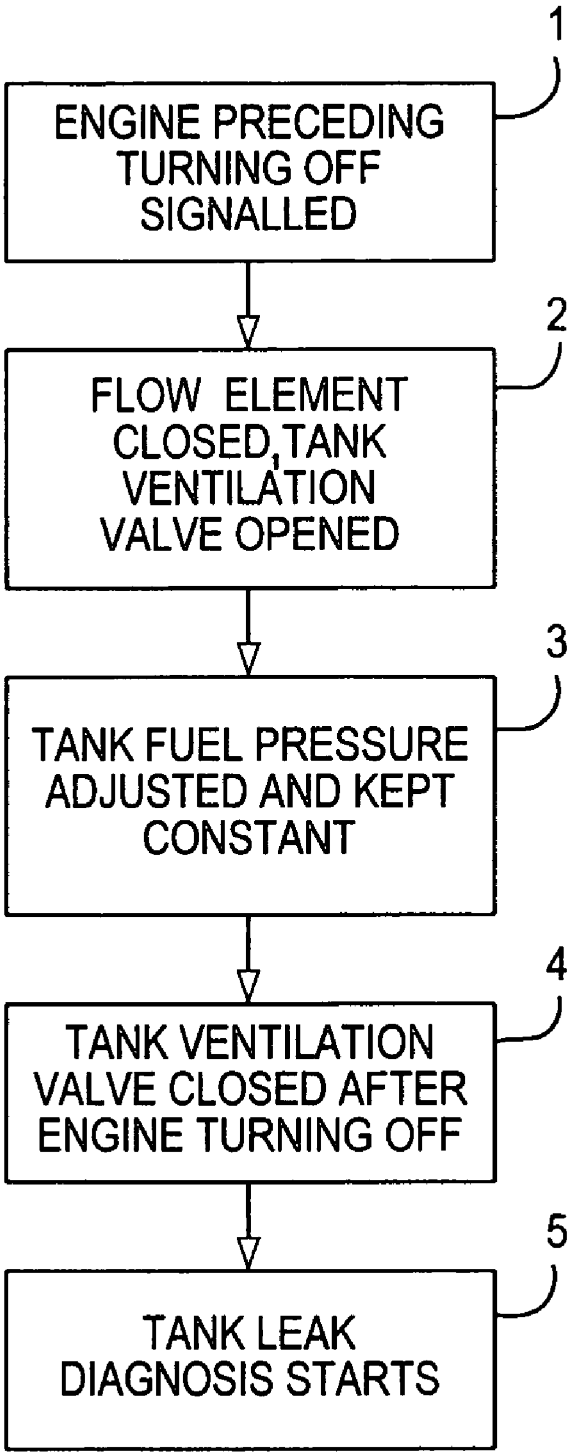
FIG. 2 is a flow-chart illustrating the steps of the inventive method of a leak diagnosis.

The flow chart of FIG. 2 illustrates a sequence of the steps of the inventive method of a tank leak diagnosis.

In Step 1 the preceding turning off of the internal combustion engine 6 is signaled. Then in Step 2 the flow element 11 is closed and the tank ventilation valve 3 is opened. In Step 3 the negative pressure in the fuel tank 1 is adjusted to a predetermined value and maintained constant. After this, in Step 4 after turning off of the internal combustion engine 6, the tank ventilation valve 3 is closed. Finally, in Step 5 the tank leak diagnosis is started.

It will be understood that each of the elements described above, or two or more together, may also find a useful application in other types of constructions differing from the types described above.

While the invention has been illustrated and described as embodied in method of tank leak diagnosis, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A method of tank leak diagnosis in a tank ventilation device including a fuel tank which is connected at least indirectly through a storage and a tank ventilation valve with a suction pipe of an internal combustion engine of the vehicle, with the storage having an aeration conduit with a check valve, the method comprising the steps of performing a tank leak diagnosis by a negative pressure after turning off of the internal combustion engine; and producing the negative pressure in the fuel tank immediately before the turning off of the internal combustion engine.

2. A method as defined in claim 1, wherein said negative pressure producing step includes producing the negative pressure in the fuel tank by closing of a flow element and at least partial opening of the tank ventilation valve, and maintaining the negative pressure approximately constant subsequently in a pressure regulating phase by regulation to a predetermined value.

3. A method as defined in claim 2, wherein said regulation of the negative pressure to the predetermined value includes regulating by a regulation selected from the group consisting of a two-point regulation and a continuous regulation.

4. A method as defined in claim 1; and further comprising closing the tank ventilation valve when the internal combustion engine is turned off.

5. A method as defined in claim 1; and further comprising producing the negative pressure in the fuel tank when a turning off signal is formed in a motor control.

6. A method as defined in claim 5, wherein said forming of a turning off signal includes producing the turning off signal when from characteristic variables of the motor control a preliminary turning off of the internal combustion engine is suspected.

7. A method as defined in claim 6; and further comprising selecting as the characteristic variable of the motor control a characteristic variable selected from the group consisting of a rotary speed, an operational condition, and a transmission stage of the internal combustion engine.

8. A method as defined in claim 5, wherein forming said turning off signal includes producing the turning off signal when a switching means which switches off the internal combustion engine is actuated.

9. A method as defined in claim 8; and further comprising turning off of the internal combustion engine after a time delay for actuation of the switching means which switches off the internal combustion engine.

10. A method as defined in claim 1; and further comprising measuring the negative pressure in the fuel tank by a pressure sensor.

* * * * *